(12) United States Patent
Sanders et al.

(10) Patent No.: US 7,945,289 B2
(45) Date of Patent: May 17, 2011

(54) IMPLEMENTING HARDWARE/SOFTWARE RESET USING PC CARD W_DISABLE LINE

(75) Inventors: Stuart B. Sanders, Cary, NC (US);
Rodney Williams, Cary, NC (US);
Christopher Hahn, Apex, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 510 days.

(21) Appl. No.: 11/856,390

(22) Filed: Sep. 17, 2007

(65) Prior Publication Data

US 2009/0075600 A1    Mar. 19, 2009

Related U.S. Application Data

(60) Provisional application No. 60/972,391, filed on Sep. 14, 2007.

(51) Int. Cl.
*H04M 1/00* (2006.01)
*H04B 1/38* (2006.01)
(52) U.S. Cl. .......................... 455/557; 370/908
(58) Field of Classification Search ............. 455/557, 455/414.1, 418, 558, 92, 200.1, 230, 426.2, 455/41.2, 41.3; 370/245, 338, 908
See application file for complete search history.

(56) References Cited

U.S. PATENT DOCUMENTS 6,209,034 B1 *   3/2001   Gladwin et al. ............. 709/227
2007/0135105 A1   6/2007   Bitou

OTHER PUBLICATIONS

International Search Report and Written Opinion for International Application No. PCT/US2008/056986 dated Aug. 24, 2009.
International Preliminary Report on Patentability for International Application No. PCT/US2008/056986 dated Mar. 25, 2010.

* cited by examiner

*Primary Examiner* — Eugene Yun
(74) *Attorney, Agent, or Firm* — Benner, Otto, Boisselle & Sklar, LLP

(57) ABSTRACT

A wireless communication module for wirelessly communicating with other devices a control pin for controlling at least one function of the communication module, an input device operatively coupled to the control pin, wherein actuation of the input device toggles a signal on the control pin between one of two different states, and a hardware reset circuit configured to implement a hardware reset of the communication module. The control pin is operatively coupled to the hardware reset circuit to at least partially implement the hardware reset, the hardware reset being different from the at least one function.

21 Claims, 2 Drawing Sheets

IMPLEMENTING HARDWARE/SOFTWARE RESET USING PC CARD W_ DISABLE LINE

RELATED APPLICATION DATA

This application claims priority of U.S. Provisional Application No. 60/972,391 filed on Sep. 14, 2007 which is incorporated herein by reference in its entirety.

TECHNICAL FIELD OF THE INVENTION

The present invention relates generally to electronic devices, such as electronic devices for engaging in wireless communications. More particularly, the invention relates to implementing a hardware reset function in a wireless communications module.

DESCRIPTION OF THE RELATED ART

Wireless computing and communications continue to reach ever deeper into our world. Coffee shop hot-spots, wireless classrooms, wireless-enabled furniture and other systems have expanded the boundaries of the wireless world. Wireless devices like computers, cell phones and personal digital assistants, etc. use wireless computer communications technology to facilitate device and work mobility. Advertised benefits of wireless technology include increasing productivity, mobility, flexibility, and efficiency.

New wireless technologies continue to be developed and offered on electronic devices. Examples of such wireless technologies include: WiFi (i.e., wireless communications based on the 802.11x standard); WiMedia; W-USB, WLP, W1394 and other wireless communications based on the ECMA-368 standard; etc. These wireless technologies, for example, offer high speed connectivity and enhanced security.

The various wireless technologies may be implemented in electronic devices in a number of different ways. For example, the specific technology may be embedded within the electronic device itself, e.g., integrated on the motherboard of the computer, cell phone, etc. Alternatively, mini cards are available that can be "plugged" into the electronic device via an expansion slot, such as a PCMCIA slot on a portable computer, for example. Using such expansion slots, the user can easily reconfigure the electronic device, such as a laptop computer, so as to enable communications over a number of different wireless technologies.

Wireless communication modules, at one time or another, may experience a software lockup condition. A software lockup condition typically is defined as a condition where a processing device (e.g., a processing device of the communication module) becomes unresponsive to commands issued by other devices and/or a user of the device. Typically, this occurs when the processing device is "stuck in a loop" (e.g., due to an error, a routine executed by the processor cannot exit or otherwise terminate in a normal manner), and this prevents the processing device from acting on other tasks/commands. Since the processing device is unresponsive to other commands, it is likely that a software generated reset command will not be effective in resetting the processor/device.

If the lockup condition does not respond to the software reset command, then the user must remove power from the device in order to allow circuits to apply a power-on reset. For removable wireless PC cards, this may include removing and then reinserting the PC card into the expansion slot. In an electronic device with an embedded wireless module, however, this can mean that the user must remove the device's battery to remove power and, thus, perform the reset. Regardless of whether the card is removed from the slot or the battery is removed from the electronic device, such a reset process can be inconvenient for the user, and depending on the device, tedious and time consuming as well.

SUMMARY

Wireless communications modules typically include a special pin or "control pin" that controls a function of the communication module (e.g., the W_Disable pin, which is referred to as the wireless LAN disable pin). Depending on how this control pin is interpreted by the device manufacturer, it may be used to place the communication module in a special mode (e.g., airplane mode), or shut down the communication module altogether.

One possible solution to the above-described lockup condition is to use the W_Disable control pin to directly control a hardware reset function of the communication module. A problem with this approach, however, is that implementing a direct reset would result in the communication module exiting software routines in an uncontrolled manner. Moreover, after recovery from the reset, it may take a significant amount of time for the communication module to reestablish communications.

The present invention provides a device and method that utilizes an existing control pin (e.g., the W_Disable pin) of the wireless communication module to implement both a hardware-based reset function and another function (e.g., a software-based reset, a device control command, etc.). For example, an input device, such as a button, may be momentarily actuated to implement a first function (e.g. a software reset, a mode change for the device, etc.). However, if actuation of the button is continued for a preset time period (e.g., the button is held in for 2 seconds), then a hardware reset is initiated. The time delay may be set via a hardware-based timer function, for example, wherein when the button is actuated, a time delay circuit is activated. If the button is not released, then a preset time period after actuation, the time delay circuit times out and the hardware reset is executed.

Additionally, the hardware-based reset function can be inhibited from commanding a reset (e.g., if it is detected that device is functioning normally, actuation of the reset may be not be desired). This can be accomplished by providing an inhibit signal to the reset circuit, wherein the inhibit signal prevents the hardware reset command from being issued.

According to one aspect of the invention, a portable electronic device includes: a communication module for wirelessly communicating with other devices, said communication module including a control pin for controlling at least one function of the communication module; and a hardware reset circuit configured to implement a hardware reset of the communication module, wherein the control pin is operatively coupled to the hardware reset circuit to at least partially implement the hardware reset, said hardware reset being different from the at least one function.

According to one aspect of the invention, the communication module is embedded in the portable electronic device.

According to one aspect of the invention, the communication module comprises a card that is removably insertable into the portable electronic device.

According to one aspect of the invention, the at least one function is a software reset command for the communication module.

According to one aspect of the invention, the hardware reset circuit further comprises a hardware timer circuit, and the portable electronic device further comprises an input device operatively coupled to the hardware timer circuit, wherein when the input device is actuated a first signal is applied to an input of the hardware timer circuit, and the hardware timer circuit outputs a second signal corresponding to the first signal a predetermined time delay after the input device is actuated.

According to one aspect of the invention, the hardware reset circuit further comprises an enable input, wherein based on a signal applied to the enable input, operation of the hardware timer circuit is enabled or disabled.

According to one aspect of the invention, the hardware timer circuit comprises: an RC circuit operatively coupled to the control pin; and a one-shot timer, wherein an input of the one-shot timer is operatively coupled to the RC circuit so as to receive a signal applied to the control pin a predetermined time delay after the signal is applied to the RC circuit.

According to one aspect of the invention, the control pin enables or disables wireless communication capability of the communication module.

According to one aspect of the invention, the control pin is a W_Disable line of the communication module.

According to one aspect of the invention, the portable electronic device is at least one of a portable computer, a mobile telephone, a personal digital assistant (PDA), a pager, an electronic organizer, a portable gaming device, or a portable media device.

According to one aspect of the invention, the communication module is based on at least one of WiFi, WiMedia, W-USB, WLP, or W1394.

According to one aspect of the invention, the communication module utilizes a radio communication medium or an optical communication medium to exchange data with other devices.

According to one aspect of the invention, a wireless communication module for wirelessly communicating with other devices includes: a control pin for controlling at least one function of the communication module; an input device operatively coupled to the control pin, wherein actuation of the input device toggles a signal on the control pin between one of two different states; and a hardware reset circuit configured to implement a hardware reset of the communication module, wherein the control pin is operatively coupled to the hardware reset circuit to at least partially implement the hardware reset, said hardware reset being different from the at least one function.

According to one aspect of the invention, the communication module is formed as an integrated circuit for embedding within a portable electronic device.

According to one aspect of the invention, the communication module is formed as a card that is removably insertable into a portable electronic device.

According to one aspect of the invention, the at least one function is a software reset command for the communication module.

According to one aspect of the invention, the hardware reset circuit further comprises a hardware timer circuit, and the wireless communication module further comprises an input device operatively coupled to the hardware timer circuit, wherein when the input device is actuated a first signal is applied to an input of the hardware timer circuit, and the hardware timer circuit outputs a second signal corresponding to the first signal a predetermined time delay after the input device is actuated.

According to one aspect of the invention, the hardware reset circuit further comprises an enable input, wherein based on a signal applied to the enable input, operation of the hardware timer circuit is enabled or disabled.

According to one aspect of the invention, the hardware timer circuit comprises: an RC circuit operatively coupled to the control pin; and a one-shot timer, wherein an input of the one-shot timer is operatively coupled to the RC circuit so as to receive a signal applied to the control pin a predetermined time delay after the signal is applied to the RC circuit.

According to one aspect of the invention, the control pin enables or disables wireless communication capability of the communication module.

According to one aspect of the invention, the control pin is a W_Disable line of the communication module.

According to one aspect of the invention, the communication module is based on at least one of WiFi, WiMedia, W-USB, WLP, or W1394.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
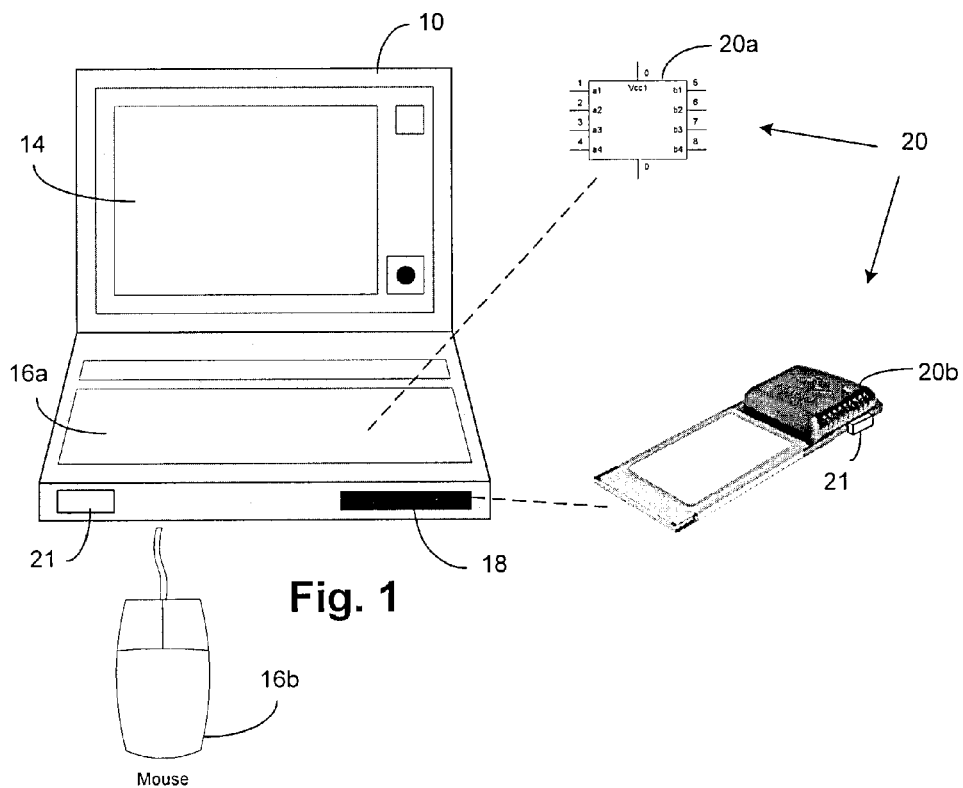
FIG. 1 is a schematic view of an exemplary portable computer including two wireless communication modules, one in the form of a PC card and the other in the form of an embedded module.

Embodiments of the present invention will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment" includes all equipment such as portable computers, mobile telephones, pagers, communicators, electronic organizers, personal digital assistants (PDAs), smart phones, portable communication apparatus, portable gaming devices, portable media devices (video and/or audio), and the like.

The term "wireless communication module" includes wireless PC cards (e.g., PCMCIA cards, PC mini cards, etc.) that may be inserted into an expansion port of an electronic device, and wireless chip sets (e.g., integrated circuits) and supporting components that may be integrated within the electronic device.

In the present application, embodiments of the invention are described primarily in the context of a portable computer, such as a laptop computer. However, it will be appreciated that the invention is not intended to be limited to the context of a portable computer and may relate to any type of appropriate electronic equipment.

Referring initially to FIG. 1, an electronic device 10 embodied as a portable computer 10 is shown. The portable computer 10 is shown as a conventional laptop computer having a block form factor, although other form factors, such as a tablet computer, for example, also may be utilized. The portable computer 10 includes a display 14 that is operative to display information to a user such as operating state, various navigational menus, images, video, graphics, mobile television content, video associated with games, etc., that enable the user to utilize the various features of the portable computer 10. A keyboard 16a and/or mouse 16b enable the user to input data into the computer 10 as is conventional.

The portable computer 10 is configured to wirelessly communicate with other devices via a wireless communication module 20 using conventional techniques. The wireless communication module 20 may be embodied as an embedded circuit 20a, wherein the hardware and logic utilized to operate the module is located within the portable computer 10 (e.g., on the motherboard). Alternatively, the wireless communication module 20 may be a mini PC card 20b, for example, wherein the card can be removably inserted into an expansion slot 18 of the computer 10 so as to provide wireless communication capabilities to the computer 10.

As described in more detail below, the wireless communication module 20 includes a reset function/circuit that utilizes an existing control pin (e.g., W_Disable) of the module 20 to implement a hardware reset function, as well as another function (e.g., a software reset). As is well known in the art, a reset function causes a device, such as the computer 10, electronic module 20, etc., to be placed in a known state (e.g., an initial state). This can be beneficial, for example, if an error occurs that prevents normal operation of the device. A software reset is a reset that is at least partially implemented via software executed by a processor. A hardware reset, on the other hand, is a reset that is strictly implemented via hardware and, thus, is more robust than a software reset. The reset function(s) can be initiated via an external switch 21 located on the PC or on the mini PC card 20b.

The reset function/circuit enables the wireless communication module 20 to be easily reset in the event of a software malfunction, without the need for removing power to the module 20. Additional details and operation of the reset function/circuit will be described below.

The wireless communication module 20 may communicate to other devices over any of a number of different mediums including, for example, radio and/or optical mediums. For example, the wireless communication module 20 may be based on the Bluetooth standard, wherein signals are wirelessly exchanged between devices over a low power radio signal. Other exemplary radio standards include, for example, WiFi (also referred to as WLAN or other wireless local area network based on the 802.11x standard), UWB, WiNET, W-USB (wireless universal serial bus), WLP (or other ECMA-368 based standard), etc. Alternatively, the wireless communication module may exchange data via optical signals, such as infrared light signals, for example.

Figure 2:
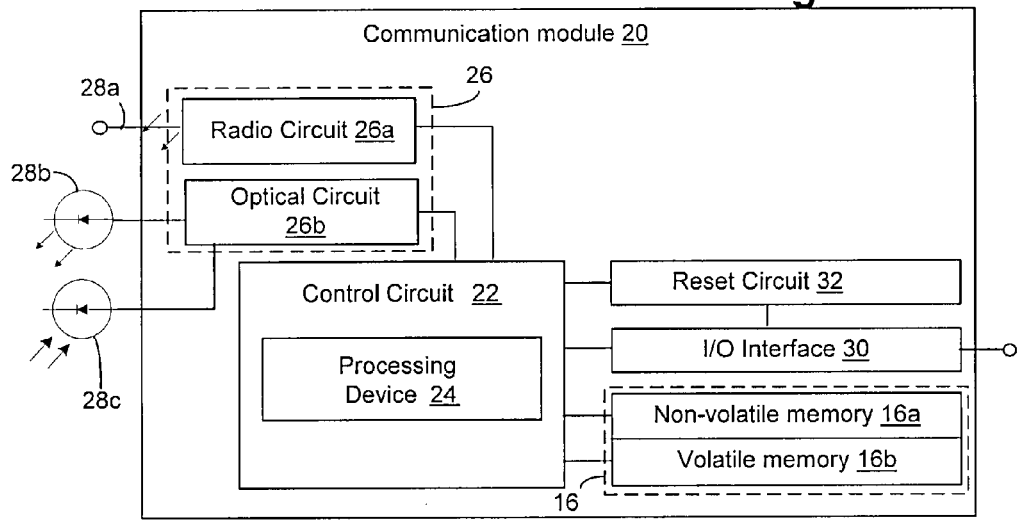
FIG. 2 is a schematic block diagram of the relevant portions of an exemplary wireless communication module in accordance with the present invention.

FIG. 2 represents a functional block diagram of an exemplary wireless communication module 20. The wireless communication module 20 includes a primary control circuit 22 that is configured to carry out overall control of the functions and operations of the module 20. The control circuit 22 may include a processing device 24, such as a CPU, microcontroller or microprocessor. The processing device 24 executes code stored in a memory (not shown) within the control circuit 22 and/or in a separate memory, such as the memory 16, in order to carry out operation of the wireless communication module 20.

The memory 16 may include a read only memory area that is implemented using nonvolatile memory 16a, and a random access or system memory area that is implemented using volatile memory 16b. As will be appreciated, nonvolatile memory tends not to lose data storage capability upon loss of power and is typically used to store data, application code, files and so forth. The nonvolatile memory 16a may be implemented with a flash memory, for example. As will be appreciated, volatile memory tends to lose data storage capability upon loss of power and is typically used to store data for access by the processing device 22 during the execution of logical routines. The volatile memory 16b may be a random access memory (RAM), such as synchronous dynamic random access memory (SDRAM), for example, but other RAM architectures that utilize memory blocks may be used. Data may be exchanged between the nonvolatile memory 16a and the volatile memory 16b as is conventional. The nonvolatile memory 16a and the volatile memory 16b may be sized as is appropriate for the particular module 20.

In addition, the processing device 24 may execute code stored in memory that implements one or more specific functions, such as a software reset function, for example. The software reset function may monitor certain parameters and/or inputs of the module 20 and, based on those parameters and/or inputs, determine whether or not the module 20 should be reset via a software command. It will be apparent to a person having ordinary skill in the art of computer programming how to program a wireless communication module 20 to carry out logical functions associated with a software reset of the module 20. Accordingly, details as to specific programming code have been left out for the sake of brevity.

Continuing to refer to FIG. 2, the exemplary wireless communication module 20 includes a local wireless interface 26, such as a radio circuit 26a or an optical circuit 26b. In the case of a radio circuit 26a, the communications module 20 can include an antenna 28a coupled to the radio circuit 26a, wherein the radio circuit 26a includes a radio frequency transmitter and receiver for transmitting and receiving signals via the antenna 28a as is conventional. The radio circuit 26a may be configured to operate in a wireless network system and may be used to send and receive data and/or audiovisual content.

In the case of an optical circuit 26b, an infrared transceiver may be utilized for transmitting and receiving data. Such infrared transceiver may include LEDs 28b for transmitting optical signals to other devices, as well as a photo diode 28c for receiving optical signals from other devices. The optical circuit 26b also may be configured to operate in a wireless network system to send and receive data.

The wireless communication module 20 may include one or more I/O interface(s) 30 coupled to the control circuit 22. The I/O interface(s) 30 may include digital I/O capabilities (e.g., inputting and/or outputting digital I/O such as switch inputs from a switch mounted on the module 20 and/or status outputs such as one or more LEDs on the module 20), serial communication capabilities (e.g., communications with an external device), and/or access to the communications bus of the computer 10 (e.g., a bus interface for receiving control signals such as clock signals, interrupts, etc. from the computer 10).

For example, the slide switch 21, which may be identified as a reset switch 21, can be operatively coupled to the I/O interface 30 such that a position of the switch 21 may be detected by the I/O interface 30. If the switch 21 is in a first position (e.g., an off or normal position), then the I/O interface 30 may detect a high or logic 1 state. If the switch 21 is in a second position (e.g., an on or reset position), the I/O interface 30 may detect a low or logic 0 state. These logic states then can be communicated to other portions of the module 20 and/or computer 10.

The wireless communication module 20 also includes the aforementioned reset function/circuit 32. As described in more detail below with respect to FIG. 4, the reset circuit 32 utilizes an existing pin (e.g., W_Disable) to implement a hardware reset function and a second function, such as a software reset function, for example. The reset circuit 32 is operatively coupled to the control circuit 22 and can provide both the hardware reset and software reset command (or other command) thereto, or simply just the hardware reset command. Additionally, the reset circuit 32 is operatively coupled to the I/O interface 30 so as to detect when a reset is requested (e.g., via the slide switch 21). Based on the location of the slide switch 21 (or other reset indicator) and a condition of the software executed by the processing device 24, the reset circuit 32 will determine whether or not a hardware reset command will be issued.

Figure 3:
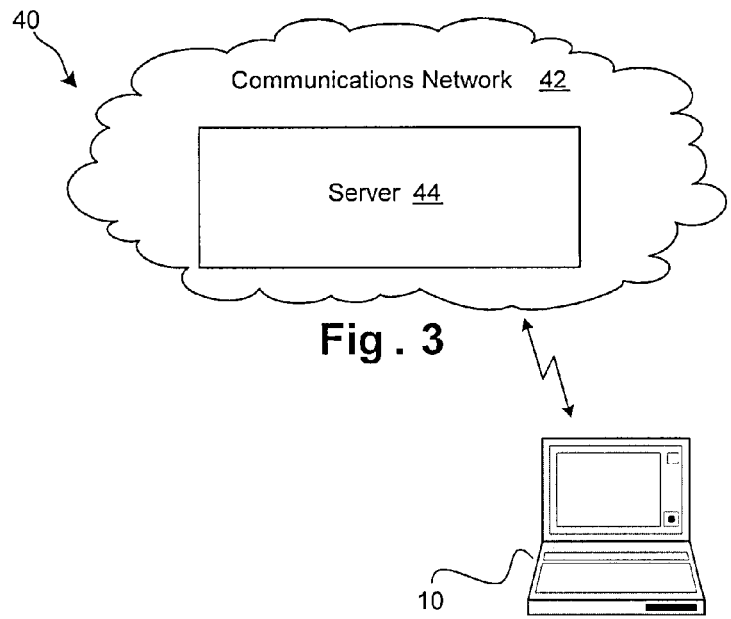
FIG. 3 is a schematic diagram of a communications system in which the portable computer of FIG. 1 may operate.

With additional reference to FIG. 3, the portable computer 10 may be configured to operate as part of a communications system 40. The system 40 may include a communications network 42 having a server 44 (or servers) for managing data transmitted from or directed to the portable computer 10 and carrying out any other support functions. The server 44 communicates with the portable computer 10 via a transmission medium, such as an electrical, radio or optical based transmission medium (e.g., via a medium provided by the communication module 20). The network 42 may include both wireless and wired transmission pathways. The network 42 may support the communications activity of multiple devices, including computers, mobile phones, PDAs, gaming systems, etc.

As will be appreciated, the server 44 may be configured as a typical computer system used to carry out server functions and may include a processor configured to execute software containing logical instructions that embody the functions of the server 44 and a memory to store such software.

Figure 4:
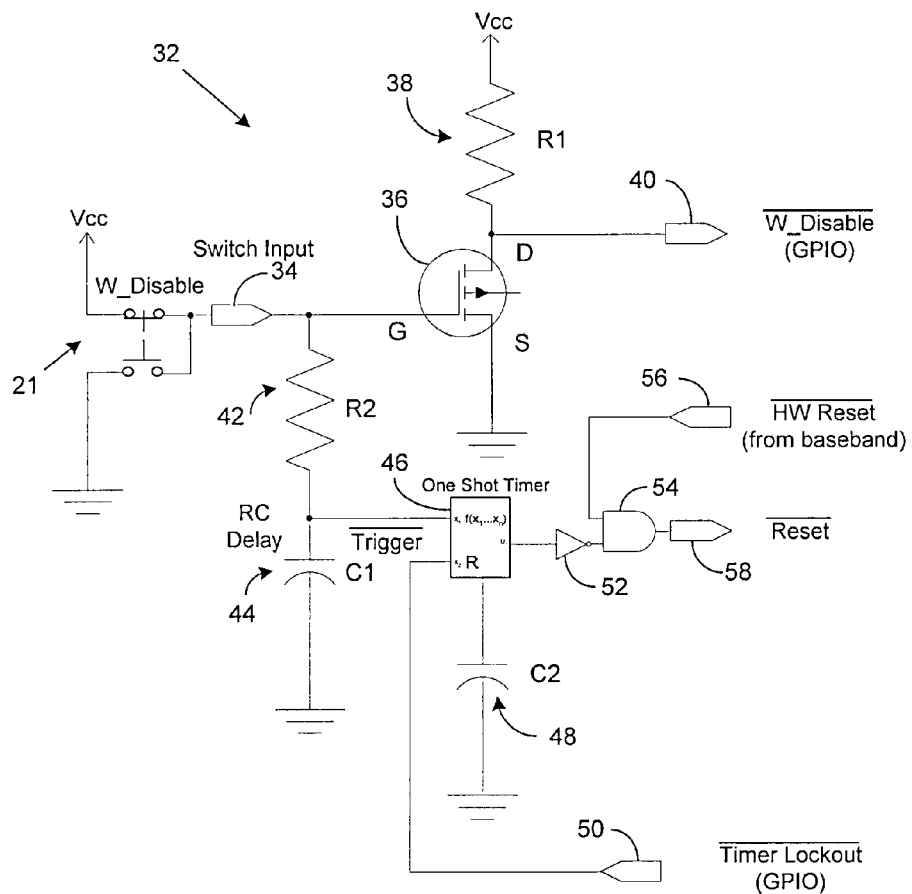
FIG. 4 is an exemplary logic circuit for implementing a hardware and software reset using a W-Disable pin in accordance with the invention.

Moving now to FIG. 4, there is shown an exemplary hardware reset circuit 32 in accordance with the invention. The hardware reset circuit 32 includes a plurality of input/output (I/O) terminals. These I/O terminals include a) Switch Input, b) $\overline{\text{TimerLockout}}$ input, c) $\overline{\text{HWReset}}$ input, d) $\overline{\text{W\_Disable}}$ output, and e) $\overline{\text{Reset}}$ output.

The "Switch Input" input effectively is analogous to the W_Disable pin and receives the reset command (e.g., the input from the switch 21 or other device that requests the reset). If this signal is high (e.g., Vcc) due to the input being coupled to Vcc, then no action is taken. If this input is low (e.g., 0 volts) due to the input being coupled to common, the reset process is initiated.

The $\overline{\text{TimerLockout}}$ input provides a means to inhibit a timer of the hardware reset circuit 32 from timing out (thereby inhibiting the hardware reset of the circuit 32). The $\overline{\text{TimerLockout}}$ pin is normally high, and only goes low upon completion of a successful software reset. This input may be used, for example, if a software reset resolved any issue with the device, or the device is deemed to be operating in a normal manner. A lock out occurs when this signal is low.

The $\overline{\text{HWReset}}$ input is a reset signal from external reset logic (e.g., external to the reset circuit) of the device. For example, the device may include a watchdog circuit that monitors address lines of a processing device. Based on the activity (or inactivity) of the address lines, the watchdog circuit may initiate a reset command. A reset command occurs when this signal is low. The $\overline{\text{HWReset}}$ input can be combined (e.g., a logical "AND" combination) with an internal reset generated by the circuit 32 so as to produce a reset output ($\overline{\text{Reset}}$) described below.

The $\overline{\text{W\_Disable}}$ output is an inverted representation of the Switch Input signal (an inverted representation of W_Disable). For example, if Switch Input is low, then $\overline{\text{W\_Disable}}$ is high, and if Switch Input is high, $\overline{\text{W\_Disable}}$ is low. The $\overline{\text{W\_Disable}}$ output may be used to implement a software reset, for example, that attempts to reset the device before implementing a hardware reset. Alternatively, the $\overline{\text{W\_Disable}}$ output may be used to implement other functions not related to the reset function (e.g., commanding the module to enter or exit a particular mode of operation).

The $\overline{\text{Reset}}$ output of the reset circuit 32 provides the hardware reset command signal. This output can be coupled to the reset line of the device so as to initiate a hardware reset of the device. A reset occurs then this signal is low.

Moving now to the details of the exemplary reset circuit 32 of FIG. 4, the reset circuit 32 includes an input terminal 34 (i.e., Switch Input which also may be referred to as the W_Disable input) that receives a user actuated command (e.g., the status of switch 21). In the present example, the input is provided by the slide switch 21 via the I/O interface 30, wherein depending on the state of the switch 21, the Switch Input terminal 34 is coupled to Vcc or to common.

The Switch Input may be a dedicated input (e.g., exclusively a reset command), or it may be a multi-functional input (e.g., a reset command and a control command). For example, it may be desired that momentary actuation of switch 21 places the device in a particular mode of operation (e.g., airplane mode, which disables the radio circuit) or performs a software reset command, while continued actuation of switch 21 initiates a hardware reset command. This multi-function ability can be accomplished using the $\overline{\text{W\_Disable}}$ output to implement the first function (e.g., mode selection or software reset), while using the $\overline{\text{Reset}}$ output to perform a hardware reset of the device. This feature is described in more detail below.

A gate terminal of a FET 36 is coupled to the input terminal 34, while a source terminal of FET 36 is coupled to common. A drain terminal of FET 36 is coupled to a first terminal of a first resistor 38 having a resistance R1 (ohms), as well as to a first output terminal 40 ($\overline{\text{W\_Disable}}$) of the reset circuit 32. A second terminal of resistor 38 is coupled to Vcc.

Moving back to the input terminal 34, this terminal also is coupled to a first terminal of a second resistor 42 having a resistance of R2 (ohms). A second terminal of the resistor 42 is coupled to a first terminal of a capacitor 44 having capacitance C1 (farads), and a second terminal of capacitor 44 is coupled to common. The combination of the resistor 42 and capacitor 44 forms a delay circuit having a time constant of R2·C1 (seconds), and the node connecting these two components is referred to as $\overline{\text{Trigger}}$. This node (i.e., $\overline{\text{Trigger}}$) is coupled to an input terminal of a one-shot timer 46. A second capacitor 48, which has a capacitance of C2 (farads), couples the one-shot timer 46 to common, and a second input terminal 50 ($\overline{\text{TimerLockout}}$) of the reset circuit 32 is coupled to a enable input of the one-shot timer 46. An output terminal of the one-shot timer 46 is coupled to an input terminal of inverter 52.

The one-shot timer 46 provides an output signal that is low and then toggles to high on a falling edge of the input signal (a falling edge of $\overline{\text{Trigger}}$), wherein the output signal lags the falling edge of the input signal by a predetermined delay time, e.g., a single pulse having a duration set by the value of C2. Further, when the enable signal of the one-shot timer 46 is low, the signal provided at the output of the one-shot timer is held low, regardless of the signal applied to the input of the one-shot timer 46.

Moving back to the configuration of the circuit 32, an output terminal of inverter 52 is coupled to a first input terminal of AND gate 54, while a third input terminal 56 ($\overline{\text{HWReset}}$) of the timer circuit 32 is coupled to a second input terminal of the AND gate 54. An output terminal of the AND gate 54 is coupled to a second output terminal 58 ($\overline{\text{Reset}}$) of the timer circuit 32.

Operation of the exemplary reset circuit 32 of FIG. 4 will now be described. When the switch 21 is in a normal state (e.g., Switch Input is coupled to Vcc), the Switch Input terminal 34 will be high, and this signal is applied to the gate of FET 36 and to the first terminal of the second resistor 42. Since the gate of FET 36 is high, the FET 36 will be in an on state thereby effectively coupling the resistor 38 to common. Current then flows through the first resistor 38 creating a voltage drop (a drop of approximately Vcc) across the first resistor 38. Thus, the voltage seen at the drain of FET 36 (and at the first output terminal 40—$\overline{\text{W\_Disable}}$) will be low.

Similarly, since the voltage at the second resistor 42 is high, then (assuming steady state), the first capacitor 44 will be fully charged and no current will flow through the second resistor 42. Thus, the voltage applied to the input of the one-shot timer circuit 46 ($\overline{\text{Trigger}}$) also will be high and, since the one shot timer 46 triggers on the falling edge of $\overline{\text{Trigger}}$, the output of the one-shot timer will be low. The inverter 52, receiving the low signal from the one-shot timer 46, produces a high signal, which is provided to the first input of the AND gate 54.

Since the first input of the AND gate 54 is high, the output of the AND gate will be dependent on the signal provided at its second input, i.e., the third input terminal 56 ($\overline{\text{HWReset}}$). If the $\overline{\text{HWReset}}$ signal is high, then the output terminal of the AND gate (and thus $\overline{\text{Reset}}$) will be high, and a reset will not occur. If the $\overline{\text{HWReset}}$ signal is low, the output terminal of the AND gate 54 (and thus $\overline{\text{Reset}}$) will be low, and a reset will occur.

Accordingly, when the signal provided to the Switch Input terminal 34 is high, the signal provided to the first output terminal 40 ($\overline{\text{W\_Disable}}$) is low, and the signal provided to the second output terminal 58 ($\overline{\text{Reset}}$) is dependent on the signal provided to the third input terminal 56 ($\overline{\text{HWReset}}$).

Moving back to the Switch Input, if the switch 21 is actuated (decoupling Switch Input from Vcc and coupling it to common), the signal seen at the Switch Input terminal 34 is low and, thus, the signal at the gate of FET 36 also is low. As a result, the FET 36 turns off and no current will flow through the first resistor 38. Since no current flows through the first resistor 38, the voltage at the drain of the FET 36 and, thus, at the first output terminal 40 ($\overline{\text{W\_Disable}}$) will be high.

Additionally, when the switch 21 is initially actuated (removing Vcc from the Switch Input 34 and coupling it to common), the first capacitor 44 is in a charged state and, thus, maintains Vcc at the input of the one-shot timer 46. Thus, when the switch 21 is initially actuated, the one-shot timer does not immediately see a falling edge signal at its input, and the output of the one-shot timer 46 will remain low. This low signal is inverted by inverter 52 to a high signal and provided to the first input terminal of AND gate 54. Accordingly, when the switch 21 is initially actuated, the output of the AND gate 54, as above, is dependent on the signal provided to third input terminal 56.

However, after a predetermined time delay (defined by the time constant R2·C1), the first capacitor 44 will discharge and, thus, the input to the one-shot timer 46 will become low. If the enable input of the one-shot timer 46 is high (i.e., the second input terminal 50 $\overline{\text{TimerLockout}}$ is high), then the one-shot timer 46 will momentarily output a high signal, which is subsequently converted to a low signal by the inverter 52. This low signal is provided to the first input of AND gate 54, thereby forcing the output of the AND gate (and thus the second output terminal 58 $\overline{\text{Reset}}$) to be low.

The function of the one-shot timer 46, however, may be overridden by the signal provided on the second input terminal 50 ($\overline{\text{TimerLockout}}$). More specifically, if the $\overline{\text{TimerLockout}}$ signal is low, the output of the one-shot timer 46 will be held low, regardless of the signal applied at its input. As a result, the second output terminal 58 $\overline{\text{Reset}}$ will be exclusively controlled by the signal provided on the third input terminal 56 ($\overline{\text{HWReset}}$) as described above with respect to the Switch Input signal being low.

Accordingly, when the Switch Input signal is low, then $\overline{\text{W\_Disable}}$ is high. Further, when is Switch Input is low, $\overline{\text{TimerLockout}}$ is high and $\overline{\text{HWReset}}$ is high, then $\overline{\text{Reset}}$ will toggle from high to low a predetermined time period after the Switch Input signal toggles from high to low. When $\overline{\text{TimerLockout}}$ is low, the one-shot timer 46 is disabled (low output), and the $\overline{\text{Reset}}$ output will follow the $\overline{\text{HWReset}}$ input.

As noted above, the reset circuit 32 enables the switch 21 to be used to command multiple functions. For example, momentary actuation of the switch 21 produces a "high to low to high transition at the Switch Input 34 (W_Disable input), while producing a corresponding "low to high to low" transition at the first output terminal 40 ($\overline{\text{W\_Disable}}$). Moreover, this momentary actuation of the switch 21 produces no change at the second output terminal 58 ($\overline{\text{Reset}}$). Thus, the $\overline{\text{W\_Disable}}$ output 40 can be used to implement other functions, while retaining the hardware reset capability of the circuit 32.

For example, the $\overline{\text{W\_Disable}}$ output terminal 40 can be provided to the control circuit 22, which in turn can use this signal to perform certain operations. One possible operation may be a software reset. Thus, when the switch 21 is momentarily actuated, a software reset can be issued, without triggering the hardware reset of the circuit 32. However, if the switch is maintained in the actuated configuration for a preset period of time, then the hardware reset command is issued and a hardware reset of the module 20 is performed.

Other possible functions that may be associated with momentary actuation of the switch 21 include, for example, commanding the module 20 to enter or exit a specific mode (e.g., each time the switch is actuated, the communication module 20 may toggle from normal mode to airplane mode), on/off switching of the module 20, module configuration settings, etc.

Additionally, by using timing capabilities of the control circuit 22, it is possible to implement three or more functions using the Switch Input 34. For example, momentary actuation of the switch 21 can be used to command a mode change, continuously actuating the switch for one second can command a software reset, and continuously actuating the switch for two or more seconds can command a hardware reset. The timing functions for both the mode change and software reset can be implemented by the control circuit 22 (e.g., via software), while the timing function of the hardware reset can be implemented strictly in hardware.

Accordingly, an existing wireless LAN disable pin of a wireless communication module can be used to perform multiple commands, including a hardware reset of the module.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A portable electronic device, comprising: a wireless communication module including a local wireless interface for wirelessly communicating with other devices, an input/output interface configured to access a communication bus of the portable electronic device, and a W_Disable line for controlling at least one function of the wireless communication module; and a hardware reset circuit configured to implement a hardware reset of the wireless communication module, wherein the W_Disable line is operatively coupled to the hardware reset circuit to at least partially implement the hardware reset, said hardware reset being different from the at least one function.

2. The portable electronic device according to claim 1, wherein the wireless communication module is embedded in the portable electronic device.

3. The portable electronic device according to claim 1, wherein the wireless communication module is configured for removable insertion into the portable electronic device.

4. The portable electronic device according to claim 1, wherein the at least one function is a software reset command for the wireless communication module.

5. The portable electronic device according to claim 1, wherein the hardware reset circuit further comprises a hardware timer circuit, and the portable electronic device further comprises an input device operatively coupled to the hardware timer circuit, wherein when the input device is actuated a first signal is applied to an input of the hardware timer circuit, and the hardware timer circuit outputs a second signal corresponding to the first signal a predetermined time delay after the input device is actuated.

6. The portable electronic device according to claim 5, wherein the hardware reset circuit further comprises an enable input, wherein based on a signal applied to the enable input, operation of the hardware timer circuit is enabled or disabled.

7. The portable electronic device according to claim 1, wherein the hardware timer circuit comprises:

an RC circuit operatively coupled to the W_Disable line; and a one-shot timer, wherein an input of the one-shot timer is operatively coupled to the RC circuit so as to receive a signal applied to the W_Disable line a predetermined time delay after the signal is applied to the RC circuit.

8. The portable electronic device according to claim 1, wherein the W_Disable line enables or disables a wireless communication capability of the wireless communication module without affecting non-communication related functions of the portable electronic device.

9. The portable electronic device according to claim 1, wherein the portable electronic device is at least one of a portable computer, a mobile telephone, a personal digital assistant (PDA), a pager, an electronic organizer, a portable gaming device, or a portable media device.

10. The portable electronic device according to claim 1, wherein the W_Disable line enables or disables a wireless communication capability of the wireless communication module without removing power from the portable electronic device.

11. The portable electronic device according to claim 1, wherein the wireless communication module comprises a processor, and said portable electronic device comprises a processor separate from the wireless communication module processor.

12. The portable electronic device according to claim 1, further comprising a user-operable input device coupled to the W_Disable line.

13. A wireless communication module for wirelessly communicating with other devices, comprising:
a local wireless interface for transmitting and receiving data;
an input/output (1/O) interface configured to access a communication bus of a portable electronic device;
a W_Disable line for controlling at least one function of the wireless communication module; and
a hardware reset circuit configured to implement a hardware reset of the wireless communication module, wherein the W_Disable line is operatively coupled to the hardware reset circuit to at least partially implement the hardware reset, said hardware reset being different from the at least one function.

14. The wireless communication module according to claim 13, wherein the wireless communication module is an integrated circuit embeddable within a portable electronic device.

15. The wireless communication module according to claim 13, wherein the wireless communication module is configured for removable insertion into a portable electronic device.

16. The wireless communication module according to claim 13, wherein the at least one function is a software reset command for the wireless communication module.

17. The wireless communication module according to claim 13, wherein the hardware reset circuit further comprises a hardware timer circuit, and the wireless communication module further comprises an input device operatively coupled to the hardware timer circuit, wherein when the input device is actuated a first signal is applied to an input of the hardware timer circuit, and the hardware timer circuit outputs a second signal corresponding to the first signal a predetermined time delay after the input device is actuated.

18. The wireless communication module according to claim 17, wherein the hardware reset circuit further comprises an enable input, wherein based on a signal applied to the enable input, operation of the hardware timer circuit is enabled or disabled.

19. The wireless communication module according to claim 13, wherein the hardware timer circuit comprises:
an RC circuit operatively coupled to the W_Disable line; and a one-shot timer, wherein an input of the one-shot timer is operatively coupled to the RC circuit so as to receive a signal applied to the W_Disable line a predetermined time delay after the signal is applied to the RC circuit.

20. The wireless communication module according to claim 13, wherein the W_Disable line enables or disables wireless communication capability of the wireless communication module.

21. The wireless communication module according to claim 13, further comprising an input device operatively coupled to the W_Disable line, wherein actuation of the input device toggles a signal on the W_Disable line between one of two different states.

* * * * *